United States Patent Office 3,729,380
Patented Apr. 24, 1973

3,729,380
PROCESS FOR PRODUCING LOW MOLECULAR
AMYLOSE ON A COMMERCIAL BASIS
Kaname Sugimoto and Mikihiko Yoshida, Okayama,
Japan, assignors to Hayashibara Company, Okayama,
Japan
Filed Apr. 14, 1970, Ser. No. 28,383
Claims priority, application Japan, Apr. 15, 1969,
44/29,170
Int. Cl. C13l 1/08
U.S. Cl. 195—31 R                                    14 Claims

ABSTRACT OF THE DISCLOSURE

Process for producing a relatively low molecular amylose having straight chain structure on a commercial basis by selectively hydrolyzing with α-1,6-glucosidase only the bonds of the branched parts in amylopectin molecules contained in starches which are high molecular polymers of glucose.

---

Figure 1:
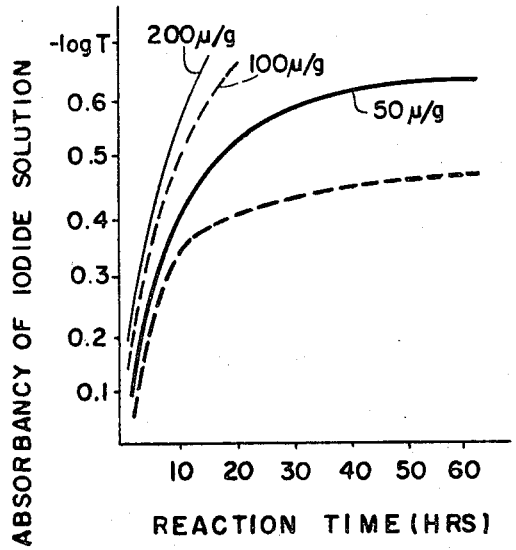

The present invention relates to a process for producing a relatively low molecular amylose having straight chain structure on a commercial basis by selectively hydrolyzing with α-1,6-glucosidase only the bonds of the branched parts in amylopectin molecules contained in starches which are high molecular polymers of glucose.

It is widely known that starches from glutinous corn or glutinous rice comprise amylopectin (high polymer having degree of polymerization of several thousands) in which glucose molecules are connected with each other in arborescent form, while common starches such as subastral starches for example wheat starch, corn starch and sago starch and subterranean starches, for example, sweet potato starch, white potato starch and cassava starch contain about 20% of amylose which is a polymer comprising glucose molecules connected with each other to form a straight chain and having a degree of polymerization of above 1000 (hereinafter referred to as D.P.) and about 80% of said amylopectin. Though its actual molecular weight or the whole structure has never been elucidated, it is reported that D.P. of the branched part of amylopectin is about 20. As supposed from the structure, amylopectin is very glutinous even in a dilute solution, and accordingly, glutinous rice and the like comprising only amylopectin are used as raw materials for ricecakes and bean-jam cakes. Other starches can be made in the form of semi-fluid paste of a high viscosity by swelling the starches in hot water, and therefore, they are used as pasty adhesives, for sizing of paper or textile, as nutritious hydrocarbon source and as additives for foods such as boiled fish paste and sausage. Industrial use of starches is being developed only as partially modified starches at present.

Recently, production of starches having high amylose contents by breeding was attempted, and starch hybrids of 50–80% amylose content have been obtained, properties thereof have been investigated and production of films, particularly edible films from starches has been attempted. Further, separation of amylose fraction from common starches has been investigated and practiced on a commercial basis. Those circumstances suggest that starch comprises a mixture of two components quite different from each other in structure and properties, molecular weights of which components are uncertain, and that its use is naturally limited, and therefore attempts have been made to obtain various products of characteristic, simple and homogeneous starch compositions. Perceiving those circumstances, the inventors made investigations on the production of amylose of simple composition by decomposing starches with an enzyme.

Hydrolysis of starch has been performed mainly with an acid or with an amylase such as α- or β-amylase or glucoamylase. By hydrolysis with an acid or α-amylase, a mixture of components having various molecular weights and structures is obtained, which is called corn syrup or starch syrup. A mixture of low molecular glucose, maltose, dextrins and oligosaccharides is obtained by hydrolysis with an enzyme. For the purpose of obtaining products of uniform structures and molecular weights, the inventors have investigated the industrial use of isoamylase, i.e. an enzyme which hydrolyzes the α-1,6-glucoside-bond in the branched part of amylopectin of branched structure (hereinafter referred to as α-1,6-glucosidase).

Alpha-1,6-glucosidase has so far been known as isoamylase contained in yeast or as R-enzyme contained in plants. Since pullulanase which decomposes pullulan was discovered from Aerobacter aerogenes in 1961 and reported in Biochem. Z. 334, 79 (1961), the enzyme has been utilized in investigations on starch structure with great interest. Those enzymes all belong to α-1,6-glucosidase and they have similar specificity on starches, though their actions on pullulan or dextran are different from each other.

Utilizing the properties of this enzyme, only the branched part of amylopectin in starch can be decomposed to obtain straight chain amylose alone having a chain length (i.e. degree of polymerization, D.P.) of near that of the branched part (D.P. 20). Thus, starches of complicated structures can be now converted into substances each having almost the same molecular weight and uniform structure. For the purpose as described above, the inventors have investigated the enzyme.

New strains producing enzymes obtained in the investigations are *Pseudomonas amyloderamosa* ATCC 21262 and *Escherichia intermedia* ATCC 21073. It has been found that strains which produce the enzyme are ray fungus such as Streptomyces, Actinomyces, Nocardia, Micromonospora and Thermonospora and other Agrobacterium, Azotobacter, Bacillus, Erwinia, Lactobacillus, Leuconostoc, Mycobacterium, Micrococcus, Pediococcus, Sarcina, Serratia, Staphylococcus and Streptococcus. The inventors have investigated the properties of the enzymes and their actions on starches, and completed the present invention relating to a process for producing amylose on a commercial basis. The significance of the present invention relating to a process for producing amylose of a simple composition by decomposing starch, a complicated mixture, is great and expansive use of starch in the starch industry is expected.

It is significant that amylose having uniform chain length and structure and having a degree of polymerization of about 20 can be obtained now from starch comprising a complicated mixture according to the process of the present invention.

In the second place, amylose obtained according to the process of the present invention is a somewhat crystalline powder free from hygroscopicity, and it can be used as an absorbent of perfume, or medicine, filler, and stable additive.

In the third place, amylose obtained according to the process of the present invention has a solubility in water of a few percent, and it is suitable for the production of products in the form of film or foamed products which should disappear after being used as edible or digestible products.

In the fourth place, due to the simple structure having no branched part, hydrolysis with α-amylase or β-amylase can be performed completely to give 100% yield without any hindrance to obtain starch syrup of a high degree of decomposition or pure maltose.

In the fifth place, due to a relatively low molecular weight and solubility in water, amylose has a remarkable effect when used as an additive for breads, and special effects are obtained when used as carbon source for culture of various microorganisms.

In the sixth place, due to straight chain structure resembling cellulose and due to affinity, effects of amylose as an additive for special papers or cellophane are expected.

In the seventh place, due to many alcohol groups contained in the amylose molecule, it is understood that various new uses are being developed as a starting material for synthesizing various foods, synthetic resins and fibers.

The process of the present invention will be explained with reference to manufacturing steps. Preferable starches to be used as starting raw materials are "glutinous starches" such as glutinous rice starch, waxy corn starch and waxy milo starch, and others such as corn starch, tapioca starch, sago starch, sweet potato starch, white potato starch, rice starch and wheat starch can also be used. Purities of those starches are different from each other. It is necessary to purify them as much as possible by means of washing, since purification after the hydrolysis is difficult.

Then, the starch must be liquefied to facilitate and to uniformalize the action of enzyme. For this purpose, starch slurry can be gelatinized homogeneously at a high temperature in the range of 130–170° C. In this case, though partial decomposition occurs in branched part or the like in starch, the decomposition does not proceed to the extent that glucose is formed. Corn starch can be liquefied in a concentration of 30–40%. The resulting liquefied product is highly viscous, but that starch slurry can be easily gelatinized homogeneously by stirring the same under heating and with introduction of steam in a vertical liquefaction tank with a continuous stirring system (Jap. Patent No. 426,978). At a pH of starch slurry of 6–5, liquefied solution of D.E. (dextrose equivalent) 0.5–3 is obtained after heating for 5–20 minutes, but preferably D.E. is 0.5–1% for the purposes of the present invention. If the pH of the starch slurry is reduced to about 4, the heating time is shortened.

A second process comprises heating starch slurry to a temperature of 100–130° C. to effect gelatinization and dispersion, wherein the temperature is first raised generally to 100° C. and then to 130° C. to complete the gelatinization and dispersion. If the concentration is increased, the operation becomes impossible and the dispersion is somewhat insufficient.

In a third process, a liquefying enzyme ($\alpha$-amylase) is used to effect dispersion and gelatinization to a low D.E. In this process, $\alpha$-amylase is used in a usual quantity of 10–20 units and stirring is effected quickly at pH 6.0–6.5 while heating to 85–96° C. in the above described continuous liquefying apparatus to obtain a liquefied product of D.E. of about 0.5–3% within a few minutes. If a subastral starch such as corn starch is used, it is necessary to use an increased amount of enzyme and to heat to 130° C. after the liquefaction to complete the dispersion and to inactivate the enzyme.

The thus obtained gelatinized starch dispersion is preferably cooled as quickly as possible and since the dispersion is very viscous due to its low decomposition rate (dextrose equivalent; D.E.) and since the viscosity increases and retrogradation of amylose occurs as temperature lowers. For this purpose, cooling by self-evaporation by spraying the liquor into a vacuum cooling tank is efficient. If enzyme is introduced at the same time by way of spraying, instantaneous cooling and instantaneous mixing of enzyme are possible. It is desirable that viscosity is lowered by performing the hydrolysis in this manner quickly before retrogradation of amylose, at the same time the mixed liquor from the cooling tank is poured into a large quantity of liquor which has been hydrolyzed to some extent and stirred during residence time and the liquefied product is diluted and hydrolysis is carried out while retrogradation is prevented. As a matter of course, the liquefied product must be controlled to a temperature and pH according to the enzyme to be used.

For the reasons described above, preferable enzymes are heat-resistant ones such as those from Lactobacillus (*Lactobacillus plantarum* ATCC 8008, *Lactobacillus brevis* IFO 3345) or ray fungus (*Streptomyces diastatochromogenes* IFO 3337, *Actinomyces globisporus* IFO 12208, *Nocardia asteroides* IFO 3384, *Micromonospora melanosporea* IFO 12515, *Thermonospora viridis* IFO 12207) developed by the inventors. In case those enzymes are used, retrogradation can be prevented by treating a liquor at pH 5–7 at a temperature of 50–60° C. to lower the viscosity.

After a residence time of longer than one hour, in a mixing tank provided with a stirrer, mixed solution having a reduced viscosity is continuously taken out and introduced into a reaction tank in which the reaction is carried out completely at an optimum pH and temperature for 24–48 hours. Preferable reaction temperature is in the range of 40–50° C.

Degree of reaction is determined by absorbancy of blue color of the liquid mixed with iodine taking advantage of the color reaction of iodine-potassium iodide solution. The results are as shown in FIG. 1.

Figure 2:
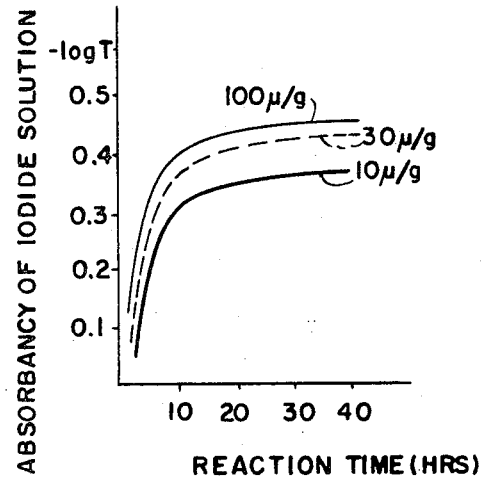
Figure 3:
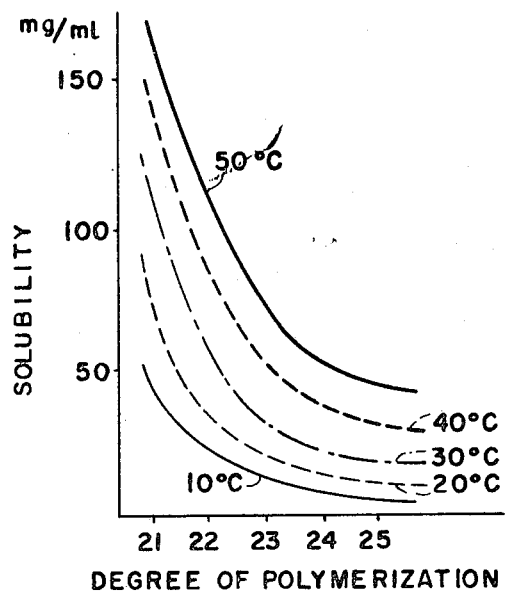

FIGS. 1 and 2 are graphs of absorbancy of amylose determined by means of color reaction, showing reaction rate in the procedure of the process of the present invention, and FIG. 3 is a graph showing the relation between degree of polymerization and solubility.

Enzymes produced by ten-odd strains other than the above heat-resistant enzymes are also usable. In those cases, mixing of enzyme solution is effected at a temperature of 45–50° C. and the subsequent reaction is carried out at 40–50° C. Though the reaction can be carried out at pH 5–7, preferable pH is 4–5.5, since an enzyme produced by Pseudomonas has a low optimum pH of 3. It seems that action of said enzyme on starches is somewhat different from other enzymes. When the enzyme is reacted on a dilute solution of glutinous corn starch or glutinous rice starch, the resulting amylose precipitates gradually and separation thereof is easy.

Preferable concentration of solids at the completion of the reaction is about 10–20%. At a concentration higher than 20%, reaction velocity is low and complete decomposition becomes difficult.

When color reaction of the liquid becomes maximum showing the completion of the reaction, the liquid is concentrated and then made into powdery form. The pulverization may be effected according to drum-drying or spray-drying. If impurities derived from enzyme added or starch used as starting raw material are in a large quantity, reaction liquid can be purified by cooling the liquid, subjecting the resulting precipitate to centrifugation and washing the precipitate with water. Also, the precipitate can be dissolved again to form 20% solution, then reprecipitated and centrifugalized to obtain product of less than 50% water content, which is then dried. The filtrate or liquid separated by the centrifugation is concentrated to form precipitate, which is then separated and dried.

Process of the present invention can be performed most easily by reacting an enzyme from Pseudomonas on glutinous rice starch or waxy corn starch. The process of the present invention will be illustrated below by way of examples.

EXAMPLE 1

(a) Preparation of enzyme and determination of activity.—Liquefying enzyme ($\alpha$-amylase) used is $\alpha$-amylase (a commercial product of Nagase Sangyo KK.) produced from *Bacillus substilis*.

Alpha-1,6-glucosidases used are those produced by *Pseudomonas amyloderamosa* ATCC 21262, *Escherichia intermedia* ATCC 21073, ray fungus such as *Streptomyces diasatochronoges* IFO 3337, *Actinomyces globisporus* IFO 12208, *Nocardia asteroides* IFO 3384, *Micromonospora*

*melanospora* IFO 12515 and *Thermonospora viridis* IFO 12207, and other *Agrobacterium tumefaciens* IFO 3085, *Azotobacter indicus* IFO 3744, *Bacillus cereus* IFO 3001, *Erwinia aroyde* IFO 3057, *Lactobacillus plantarum* ATCC 8008, *Leuconostoc mesenteroides* IFO 3426, *Mycobacterium phlei* IFO 3158, *Micrococcus lysodeikticus* IFO 3333, *Pediococcus acidilactici* IFO 3884, *Sarcina rutea* IFO 3232, *Serratia indica* IFO 3759, *Staphylococcus aureus* IFO 3061 and *Streptococcus faecalis* IFO 3128.

(b) Determination of enzyme activity.—In several test tubes, mixture of 1.0 g. of anhydrous white potato starch, 1.0 ml. of M/10 acetate buffer solution and 8.0 ml. of water is placed, to each of which is added 1.0 ml. of enzyme ($\alpha$-amylase) solutions of various concentrations and the whole is vigorously agitated in boiling water. After the starch is gelatinized, the whole is kept at 65° C. for 15 minutes and then kept in boiling water for 10 minutes to inactivate the enzyme.

Thereafter, the whole is cooled in water of 17° C. for 3 minutes, into which is then added 1 ml. of 0.1% Fuchsine solution.

Mouth of the tube is closed and the tube is rotated two times to obtain uniformly colored solution in each tube. Activity of enzyme of the lightest solution among uniformly colored tubes is arranged as 1 unit.

Activity of $\alpha$-1,6-glucosidase is determined as follows:

One milliliter of the enzyme solution, 5 ml. of 1% soluble glutinous rice starch and 1 ml. of 0.5 M acetate buffer solution (pH 6.0) are mixed and incubated at 40° C. for 30 minutes. The reaction solution (0.5 ml.) is poured into mixture of 0.5 ml. of 0.01 M iodine/potassium iodide solution and 15 ml. of 0.01 N sulfuric acid and the optical density of resulting blue-purple color solution is determined after 15 minutes at 620 m$\mu$ wave length. Difference from optical density at the start of the reaction is calculated, and activity affording the difference in optical density of 0.01 is arranged as 1 unit.

(c) Preparation of enzyme solution.—(1) Enzyme produced by *Escherichia intermedia* ATCC 21073 is inoculated (in the quantity of one platinum wire loop) in 100 ml. of culture medium containing 0.5% of maltose, 0.8% of peptone and 0.5% sodium nitrate in 500 ml. Sakaguchi's flask. After shaking culture in a reciprocating agitator of 125 r.p.m. at 30° C. for 48 hours, $\alpha$-1,6-glucosidase activity in the culture liquid becomes maximum. At that time, the microbe is removed by means of centrifugation to obtain enzyme solution.

In the purification of the enzyme in the isoamylase solution, fractions which precipitate within ammonium sulfate concentration of 15–48% are taken and then dehydrated and dried. The enzyme thus obtained is used in the form of solutions of various concentrations according to quantities to be used. Optimum pH is 5.5–6.0 and optimum temperature is 45° C.

(2) Alpha-1,6-glucosidase from *Pseudomonas amyloderamosa* SB–15 ATCC 21262 is inoculated in sterilized medium of pH 7 containing 2% of maltose, 0.2% of sodium glutamate, 0.3% of $(NH_4)_2HPO_4$, 0.1% of $KH_2PO_4$ and 0.05% of $MgSO_4 \cdot 7H_2O$. After shaking culture at 30° C. for 120 hours, enzyme activity is determined to reveal 180–220 units per 1 ml. of the culture medium. The culture liquid is subjected to centrifugation at 10,000 r.p.m. for 10 minutes to remove the microbe whereby supernatant liquid is obtained. The liquid is then added with cold acetone under cooling and stirring until 75% concentration to precipitate the enzyme.

The enzyme thus precipitated is collected by centrifugation followed by freeze-drying under vacuum to obtain $\alpha$-1,6-glucosidase in powdery form. Yield: 80–90%. The product is stable in dry state. The product can be purified by salting out with ammonium sulfate or the like. Optimum working pH is 3. The product is stable in the pH range of 3–6. Optimum working temperature is in the range of 40–50° C.

(3) *Lactobacillus plantarum* is inoculated in 7 ml. of sterilized medium containing 1% of peptone, 0.5% of yeast extract, 0.1% of $K_2HPO_4$, 0.05% of NaCl, 0.05% of $MgSO_4 \cdot 7H_2O$, 0.001% of $FeSO_4 \cdot 7H_2O$, 2% of $MnSO_4 \cdot 4H_2O$, 0.7% of liquefied starch and 0.5% of maltose. After culture at 30° C. for one day, it is transferred into 10 liter medium and cultured at 30° C. for 2 days. At the completion of the culture, pH is 4.0, exocellular activity is 16 and intercellular activity is 17, the total being 33 units/ml.

*Micrococcus lysodeikticus* IFO 08333 from fresh slant culture is inoculated in the quantity of one platinum wire loop in each 100 ml. medium of pH 7.0 containing 1% of maltose, 0.5% of peptone, 0.25% of yeast extract, 0.2% of urea, 0.2% of meat extract, 0.1% of $K_2HPO_4$, 0.45% of KCl, and 0.05% of $MgSO_4 \cdot 7H_2O$, and cultured for one day. Four media thus obtained are each transferred into 20 liter jar culture medium and aerated culture is effected under stirring at 200 r.p.m. at 30° C. for 3 days. The final pH is 8.2. Exocellular activity is 12 and intercellular activity is 39, the total being 51 units/ml.

In the former two culture liquids, microbes are collected by continuous centrifugation, washed once with pure water, suspended in buffer solution (in the volume of 1/10 of the culture liquid) of pH 7.0 containing 0.1% SDS, agitated at 30° C. for 2 days and centrifuged. The supernatant liquid is added with ammonium sulfate to 0.8 saturation. The resulting precipitate is removed and dissolved in water, dialyzed against water for one day and then centrifuged. Each of thus resulting supernatant solutions is used as enzyme solution.

Optimum pH for Lactobacillus is 5–6.5 and for Micrococcus is around 6–7. Optimum temperature for Micrococcus is around 45° C. and for Lactobacillus is around 50–60° C. They are highly heat-resistant as compared with other enzymes.

(4) Each of Streptomyces, Actinomyces, Nocardia, Micromonospora and Thermonospora belonging to ray fungus is inoculated in the quantity of one platinum wire loop in culture solution of pH 7.0 containing 1% of liquefied starch, 0.5% of peptone, 0.5% of meat extract and 0.5% of salt in 1000 ml. flask, sterilized in a usual manner at 30° C. for 20 minutes, and subjected to shaking culture at 30° C. for 4 days.

The enzyme solution is salted out with ammonium sulfate at 0.4–0.6 saturation and treated with 0.02 N acetic acid buffer solution of pH 7.0. Thereafter, the solution is adsorbed with DEAE cellulose and eluted with 0.02 N acetic acid buffer solution 0.5 N NaCl solution to effect partial purification. Optimum pH is 5.0–7.0 and optimum temperature is 50–60° C. They are highly heat-resistant as compared with other enzymes.

(5) Other 11 strains producing enzymes, i.e. Agrobacterium, Azotobacter, Bacillus, Erwinia, Leuconostoc, Mycobacterium, Pediococcus, Sarcina, Serratia, Staphylococcus, and Streptococcus are each subjected to shaking culture for 4 days in sterilized medium containing 1.0% of peptone, 0.5% of yeast extract, 0.1% of $K_2HPO_4$, 0.05% of NaCl, 0.001% of $MgSO_4 \cdot 7H_2O$ and 1.4% of liquefied starch in 1000 ml. flask. The microbe obtained by centrifugation is suspended in a buffer solution containing 0.1% of SDS. After rotatory agitation of 30° C. for two days, the supernatant liquid of the culture solution is taken out and purified by salting out with ammonium sulfate at 0.8 saturation, then the resulting precipitate is dissolved in water, dialyzed for 24 hours and centrifuged. The resulting supernatant liquid is used as enzyme solution. Optimum pH is about 5–7, and optimum temperature is 45–50° C.

(d) Determination of sugar composition and measurement of progress of reaction.—A hydrolyzed starch solution is purified with active carbon or by means of ion exchange and subjected to paper chromatography. Each separated component is then extracted with water, hydrolyzed and determined according to Somogyi's method.

Each component is expressed by jercentage based on the total quantity of the detected sugar.

Decomposition rate of a liquefied solution is represented by percentage based on (total quantity of sugar after hydrolysis of reducing sugar with hydrochloric acid according to Iane·eynon method) ×0.9.

The measurement of progress of reaction is effected in the following manner. The reaction is stopped by adding 9 ml. of N/10 hydrochloric acid, per ml. of the reaction solution, then the solution is taken out in the quantity corresponding to 10 ml. of sugar determined according to anthrone method, in which are added 2 ml. of acetate buffer solution of pH 4.0 and 0.5 ml. of 0.3% aqueous iodine/potassium iodide solution to make the total quantity 100 ml. After 30 minutes, optical density is determined at wave length of 570 m$\mu$. Ever-changing optical density against quantity of enzyme added is shown in FIG. 1. The termination of reaction is judged from the curve in FIG. 1.

Hydrolysis of various starches with $\alpha$-1,6-glucosidase.— Waxy corn starch, glutinous rice starch, white potato starch, etc. are purified sufficiently and made into 5–10% suspensions. The suspensions are adjusted to pH 4.0–5.0 when enzyme from Pseudomonas is used, and to around pH 6.0 when other enzymes are used. The suspensions are then gradually heated under stirring to effect gelatinization. For completing the gelatinization, the suspensions are finally heated under a vapor pressure of 1.5–2.0 kg./cm.$^2$ for 20 minutes to effect dispersion and quickly cooled to 45° C., to which are then added 20–100 units of $\alpha$-1,6-glucosidase per gram of starch. The reaction is carried out at 45° C. under stirring. During about initial 15 hours, the reaction proceeds quickly. The progress of the reaction is judged referring to the curve in FIG. 1 in iodine reaction.

Viscosities of reaction mixture are quickly lowered during initial 1–2 hours, suggesting the progress of the reaction. In case enzyme from Pseudomonas is used, the resulting amylose is precipitated as the reaction proceeds, and after completion of the reaction is ascertained, the product is concentrated to 20% concentration, and allowed to stand overnight to complete precipitate. The precipitate thus formed is centrifuged, dissolved again in water to form 20% solution, which is then allowed to cool to form precipitates and again centrifuged to isolate the product. The product is dried at 45° C. and then pulverized.

In case another enzyme is used, concentration, cooling and precipitation are effected in the same manner to obtain the product. When glutinous rice starch or waxy corn starch is used as raw material, treatment with enzyme from Pseudomonas is most easy. No difference is found among results of comparative tests on ten-odd enzymes, other than that of Pseudomonas.

EXAMPLE 2

Purified glutinous starch in the concentration of 30% by weight having pH 6.0 is continuously introduced under pressure pressed in the bottom of a cylinder of multi-wing system. At the same time, steam is also introduced under pressure pressed in the bottom of the cylinder. The starch is heated to 160–165° C. under vigorous stirring to effect gelatinization. The resulting gelatinized liquid is taken out from the upper part of the cylinder. Then the liquid is introduced into a series of several cylinders for residence time of 10–20 minutes to obtain gelatinized liquid of D.E. 0.5–3%. The viscous liquefied product is quickly cooled to 60° C. by spraying into a vacuum cooling tank through a reducing valve, and at the same time, enzyme produced by Lactobacillus is sprayed. After the instantaneous cooling and mixing, the cooled liquid is taken out by a pump and mixed in a mixing tank. Then the reaction is carried out in a reaction tank in batch system while the reaction liquid is continuously taken out in such a manner that residence time is longer than one hour. The reaction tank is controlled to pH 6.0 and temperature of 50° C. After completion of the reaction, the reaction product is heated to inactivate the enzyme and then cooled, and the resulting precipitate is collected in the same manner as in Example 1 to obtain the final dry product. Due to the high concentration, reaction tank of a small capacity can be used and concentration step is unnecessary.

In the same manner as above, heat resistant enzymes produced by five strains of ray fungus such as Streptomyces are treated in the same manner and favorable results are obtained. In those processes, the treatments can be effected easily, since mixing of each enzyme is effected at a relatively high temperature and the reaction is carried out in two steps in spite of a high concentration.

EXAMPLE 3

Each of various starches is purified and adjusted to pH 6.0 and concentration of 20–35%, to which are then added 5–10 units of pure $\alpha$-amylase per gram of starch. The mixture is introduced under pressure in the above mentioned continuous liquefying apparatus (disclosed in Jap. Pat. No. 426,978) and heated by means of steam to 90–95° C. under stirring. After holding time of 3–5 minutes, viscous gelatinized liquid is obtained, which is transparent and homogeneous liquid having D.E. of 0.5–1. While the gelatinized high temperature liquid is cooled quickly to 55–60° C. by spraying into a vacuum cooler in the same manner as in Example 2, a heat resistant enzyme produced by a ray fungus is continuously introduced in a quantity of 20–50 units per gram of starch, and the whole is cooled and mixed to effect the first reaction step. During the reaction, introduction and mixing of the gelatinized liquid and taking out of the reaction liquid are effected in such a manner that holding time in the mixing tank is 1–2 hours. The taken out reaction liquid of a reduced viscosity is transferred to a reaction tank, in which the reaction is carried out in batch system at 45° C. for 25–40 hours. In case the enzyme inactivation is observed in the first reaction step, additional enzyme is introduced in the next reaction tank of batch system. In case liquefied product has a low D.E. and a high viscosity, temperature in the first step of enzyme introduction is elevated to around 60° C., and additional enzyme is introduced in the next reaction tank. In this manner, favorable results are obtained.

Summary of experimental results (a) Concentration of liquefied product.—In Example 1, no change in reaction ratio judged by color reaction is found at a concentration of up to 10%. It seems that the reaction velocity is lower at a concentration higher than 20%. In Example 2, comparison is made at 5–30% concentration and the similar results are obtained at a concentration up to 20%.

(b) Quantity of enzyme used.—In the reaction at 45–50° C. for 48 hours, necessary quantity of enzyme is higher than 20 units per gram of starch by weight. If quantity of enzyme is less than 10 units, the reaction proceeds very slowly. Quantity of enzyme of higher than 100 units is harmful on the contrary, since it causes other reaction.

(c) Average degree of polymerization and branching degree.—Average degree of polymerization is determined according to "Measurement of Reduction End-Group According to Oxidation With Periodic Acid" in "Method in Carbohydrate Chemistry" vol. 5, p. 251.

Branching of product (i.e. number of branches) is measured according to T. K. Hamilton, F. Smith "Journal of American Chemical Society" 78, 5910 (1956).

Table 1 shows degree of polymerization and number of branches obtained by reacting enzyme produced by Pseudomonas on waxy corn starch. Table 2 shows results obtained by reacting the enzyme twice or thrice on the precipitate obtained in the same manner.

TABLE 1

| Kind of starch | Concentration of starch (percent) | Enzyme used (Pseudomonas)[1] | Soluble fraction (S) Precipitated fraction (P) | Degree of polymerization | Average branch number |
|---|---|---|---|---|---|
| P | 1 | 100 | S | 22.1 | 1.5 |
|   |   |     | Butanol P | 58.9 | 0.9 |
| W (I) | 1 | 100 | S | 21.8 | 1.3 |
|       |   |     | P+ |       |       |
| W | 5 | 100 | S | 22.5 | 1.4 |
|   |   |     | P | 35.1 | 1.5 |
| W | 5 | 20 | S | 29.5 | 1.8 |
|   |   |    | P | 31.0 | 2.5 |
| W | 10 | 50 | S | 20.2 | 1.9 |
|   |    |    | P | 31.3 | 2.3 |
| W | 20 | 50 | S | 21.1 | |
|   |    |    | P | 35.1 | |
| W (II) | 25 | 50 | S | 20.3 | |
|        |    |    | P | 35.5 | |

[1] Units of starch per gram.

NOTE.—W=Waxy corn starch; P=Potato starch; I=Treatment in Example 1; II=Treatment in Example 2.

TABLE 2

| Number of reaction times | Concentration (percent) | Quantity of enzyme (Pseudomonas) | Reaction time | Soluble fraction | | Precipitated fraction | |
|---|---|---|---|---|---|---|---|
| | | | | Degree of polymerization | Branch number | Degree of polymerization | Branch number |
| 1 | 5 | 50 units | 48 | 19.5 | 2.2 | 31.4 | 2.1 |
| 2 | 1 | do | 24 | 17.8 | 1.3 | 21.2 | 1.3 |
| 3 | 1 | do | 24 | 17.5 | 1.2 | 21.1 | 1.2 |

In view of the above table, it seems that at the enzyme quantity of 50 units, the precipitated part contains partially not completely decomposed molecules. Degree of polymerization of starch containing amylose is high, and a reason therefor is considered to be that natural amylose remains in the precipitated part. It appears that branch is scarcely contained.

(d) Yield of products:

TABLE 3

| Starch | Concentration (percent) | Enzyme Pseudomonas | Reaction time | Soluble fraction | | Precipitated fraction | | Total yield/starch (percent) |
|---|---|---|---|---|---|---|---|---|
| | | | | DP[1] | Percent | DP[1] | Percent | |
| W | 5 | 100 units | 48 | 19.8 | 10.0 | 28.1 | 90.0 | 70 |
| W | 10 | 50 units | 48 | 21.0 | 19.0 | 34.5 | 81.0 | 88 |
| W | 10 | do | 48 | 20.5 | 20.1 | 35.1 | 79.9 | 92 |
| W | 10 | do | 48 | 20.8 | 15.2 | 35.2 | 84.8 | 75 |
| W | 5 | 100 units | 48 | 21.5 | 30.1 | 28.1 | 69.9 | 89 |

[1] Degree of polymerization.

From the above results, the yields are summarized as follows:

TABLE 4

| Enzyme of Pseudomonas | | Precipitated fraction | Soluble fraction | Branching coefficient |
|---|---|---|---|---|
| 50 units | Degree of polmerization | 20–30 | 20 | 1–2 |
|          | Yield | 90 | 10 | |
| 100 units | Degree of polymerization | 30–35 | 20 | 1–2 |
|           | Yield | 80 | 20 | |
| More than 100 units | Degree of polymerization | 23–24 | 18–20 | 1–0 |
|                     | Yield | 90 | 10 | |

(e) Results on various starches:

TABLE 5

| | Yield of amylose | | | | Average degree of polymerization | | | |
|---|---|---|---|---|---|---|---|---|
| | Soluble fraction | | Precipitation with butanol | | Soluble fraction | | Precipitated fraction | |
| Kind of starch | (5%) | (10%) | (5%) | (10%) | (5%) | (10%) | (5%) | (10%) |
| Tapioca | 71 | 64 | 29 | 36 | 24 | 24 | 88 | 56 |
| Corn | 55 | 54 | 45 | 46 | 24 | 21 | 68 | 59 |
| Wheat | 40 | 51 | 60 | 49 | 23 | 22 | 79 | 81 |
| Sweet potato | 57 | 59 | 43 | 41 | 25 | 25 | 65 | 76 |
| Sago | 61 | 55 | 39 | 45 | 24 | 19 | 61 | 57 |

NOTE.—Enzyme used is one produced by Lactobacillus (50 units per gram of starch. Concentration is shown in percentages (5%) and (10%).

Table 5 suggests that no significant difference in degree of polymerization is found in soluble fraction (ranging from 21–25), suggesting amylose decomposed at branched parts, and that high degree of polymerization in precipitated fraction shows semi-decomposed product or natural amylose contained therein.

(f) Solubility of product:

A sample is dissolved in water at a predetermined temperature and kept at a constant temperature overnight to form precipitate. Quantity of sugar in supernatant liquid of this saturated solution is measured according to anthrone method. The result is shown as solubility. The results on the products obtained by using various enzymes produced by Pseudonomas, etc. are shown in FIG. 3. Relation between degree of polymerization and solubility is shown.

(g) Specific rotatory power:

Two grams of each sample are dissolved in 100 ml. of 30% aqueous $CaCl_2$ solution and specific rotatory power is measured.

TABLE 6

| Starch | Enzyme | Method | Degree of polymerization | $[\alpha]_D^{22}$ |
|---|---|---|---|---|
| W | Pseudomonas | P | 32 | 194.9 |
|   | do | S | 20 | 188.9 |
|   | do | P | 23 | 193.0 |
|   | Reaction repeated | S | 20 | 175.3 |
| P | Lactobacillus | P | 24 | 163.3 |
|   | do | S | 21 | 150.4 |

Wide dispersion is observed in the results.

(h) Determination of viscosity:

B-type rotation viscometer and BL adapter of 60 rotation are used. The results are shown in FIG. 7, which shows that viscosities are relatively low.

TABLE 7

| Sample | Degree of polymerization | Concentration | Viscosity (cp.) at— | | |
|---|---|---|---|---|---|
| | | | 60° C. | 50° C. | 40° C. |
| W Pseudomonas soluble | 20.8 | 15 | 1.37 | 1.50 | 1.89 |
| | | 10 | 0.97 | 1.29 | 1.40 |
| | | 5 | 0.89 | 0.97 | 1.14 |
| W Pseudomonas precipitated | 25.7 | 15 | 6.19 | 6.32 | 6.46 |
| | | 10 | 4.32 | 4.50 | 4.85 |
| | | 5 | 1.23 | 1.58 | 2.10 |
| P Lactobacillus soluble | 24.5 | 15 | | 2.03 | 2.25 |
| | | 10 | | 1.42 | 1.84 |
| | | 5 | | 1.13 | 1.15 |
| W Lactobacillus soluble | 23.5 | 15 | | 3.01 | 3.96 |
| | | 10 | | 1.82 | 2.40 |
| | | 5 | | 1.15 | 1.48 |
| P Pseudomonas soluble | 21.3 | 15 | | 1.61 | 2.10 |
| | | 10 | | 1.20 | 1.75 |
| | | 5 | | 1.00 | 1.12 |
| 43° D.E. Millet jelly water | | 10 | 0.94 | | |
| | | | 0.90 | | |

(i) Hygroscopicity:

At relative humidity of 80% and at temperature of 30° C., hygroscopicities of powdery products are compared with each other. It is observed that moisture content reaches 10% during 72 hours, and thereafter the moisture content is in equilibrium state. It is noted that their properties are close to those of starch due to the crystallinity. Powdery products of soluble fractions reach equilibrium state in concentrations of 12–13%.

(j) Quantity of impurities in the product:

Nitrogen and inorganic contents considered to be derived from enzyme and raw material are measured in the form of ash. The results are as follows:

| Sample | Crude protein, percent | Ash content, percent |
|---|---|---|
| W Pseudomonas enzyme soluble | 1.01 | 0.030 |
| W Pseudomonas enzyme precipitated | 0.50 | 0.010 |

As described above in detail, according to the process of the present invention, it is now possible to produce on a commercial basis low molecular amyloses having a degree of polymerization of 20–30. Novel uses of starch in a wide range are expected.

It will be obvious to those skilled in the art that various changes may be made without departing from the scope of the invention and the invention is not to be considered limited to what is shown in the drawings and described in the specification.

What is claimed is:

1. A process for producing low molecular weight amylose having a DP of 20–30 comprising the steps of:
   gelatinizing or liquefying glutinous or common starch to produce a starch solution;
   quickly cooling said starch solution to a temperature of 50–60° C.; immediately subjecting said cooled starch solution for a period of 1–2 hours to a heat resistant α-1,6-glucosidase obtained from the genus Lactobacillus or from ray fungus in order to lower the viscosity of said starch solution;
   further cooling said starch solution to a temperature of 40–50° C. and continuing to react the starch solution with α-1,6-glucosidase for 24–48 hours in order to debranch said amylopectin.

2. A process for producing low molecular weight amylose in accordance with claim 1 wherein:
   said starch having a high amylopectin content is selected from the group consisting of glutinous rice starch, waxy corn starch, waxy milo starch, corn starch, tapioca starch, sago starch, sweet potato starch, white potato starch, rice starch and wheat starch.

3. A process for producing low molecular weight amylose in accordance with claim 2 wherein:
   said starch having a high amylopectin content is selected from the group consisting of glutinous rice starch, waxy corn starch and waxy milo starch.

4. A process for producing low molecular weight amylose in accordance with claim 1 wherein:
   said heat resistant α-1,6-glucosidase is produced by *Lactobacillus plantarum, Lactobacillus brevis, Streptomyces diastatochromogenes, Actinomyces globisporus, Nocardia asteroides, Micromonospora melanosporea* or *Thermomonospora viridis*.

5. A process for producing low molecular weight amylose in accordance with claim 1 wherein:
   said quickly cooling step is accomplished by spraying said gelatinized or liquefied starch into a vacuum cooling tank and said α-1,6-glucosidase is added thereto by simultaneously spraying into said vacuum cooling tank such that the viscosity of said starch solution is reduced before the retrogradation thereof.

6. A process for producing low molecular weight amylose in accordance with claim 1 wherein:
   said gelatinizing or liquefying step is accomplished by heating said starch to a temperature of 130–170° C. until a D.E. of 0.5–3 is obtained.

7. A process for producing low molecular weight amylose in accordance with claim 1 wherein:
   said gelatinizing or liquefying step is accomplished by subjecting said starch to α-amylase while heating to 85–96° C. until a D. E. of about 0.5–3 is obtained.

8. A process for producing low molecular weight amylose having a DP of 20–30 comprising the steps of:
   gelatinizing or liquefying glutinous or common starch to produce a starch solution;
   quickly cooling said starch solution to a temperature of 45–60° C.
   immediately subjecting said cooled starch solution for period of 1–2 hours to α-1,6-glucosidase in order to lower the viscosity of said starch solution;
   further cooling said starch solution to a temperature of 40–50° C. and continuing to react said starch solution with α-1,6-glucosidase for 24–48 hours in order to debranch said amylopectin.

9. A process for producing low molecular weight amylose in accordance with claim 8 wherein:
   said starch having a high amylopectin content is selected from the group consisting of glutinous rice starch, waxy corn starch, waxy milo starch, corn starch, tapioca starch, sago starch, sweet potato starch, white potato starch, rice starch and wheat starch.

10. A process for producing low molecular weight amylose in accordance with claim 8 wherein:
    said starch having a high amylopectin content is selected from the group consisting of glutinous rice starch, waxy corn starch and wax milo starch.

11. A process for producing low molecular weight amylose in accordance with claim 8 wherein:
    said α-1,6-glucosidase is produced by *Escherichia inter-*

*media, Agrobacterium tumefaciens, Azotobacter indicas, Bacillus cereus, Erwinia aroidie, Leuconostoc mesenteroides, Mycobacterium phlei, Micrococcus lysodeikticus, Pediococcus acidilactici, Sarcina rutea, Serratia indica, Stapylococcus aureus* or *Streptococcus faecalis.*

12. A process for producing low molecular weight amylose in accordance with claim 8 wherein:
said quickly cooling step is accomplished by spraying said gelatinized or liquefied starch into a vacuum cooling tank and said α-1,6-glucosidase is added thereto by simultaneously spraying into said vacuum cooling tank such that the viscosity of said starch solution is reduced before the retrogradation thereof.

13. A process for producing low molecular weight amylose in accordance with claim 8 wherein:
said gelatinizing or liquefying step is accomplished by heating said starch to a temperature of 130–170° C. until a D.E. of 0.5–3 is obtained.

14. A process for producing low molecular weight amylose in accordance with claim 8 wherein:
said gelatinizing or liquefying step is accomplished by subjecting said starch to α-amylase while heating to 85–96° C. until a D.E. of about 0.5–3 is obtained.

References Cited

UNITED STATES PATENTS

| | | | |
|---|---|---|---|
| 3,556,942 | 1/1971 | Hathaway | 195—31 |
| 3,532,602 | 10/1970 | Seidman | 195—31 |
| 3,560,345 | 2/1971 | Yokobayashi et al. | 195—66 |
| 3,632,475 | 1/1972 | Sugimoto et al. | 195—31 R |
| 3,663,369 | 5/1972 | Morehouse et al. | 195—31 R |

OTHER REFERENCES

Sakano et al., Agr. Biol. Chem., vol. 33, pp. 1535–40, 1969.

Ueda et al., App. Micio, vol. 15, pp. 492–496, 1967.

A. LOUIS MONACELL, Primary Examiner

G. M. NATH, Assistant Examiner